US009851896B2

(12) United States Patent
Jitkoff

(10) Patent No.: US 9,851,896 B2
(45) Date of Patent: Dec. 26, 2017

(54) EDGE SWIPING GESTURE FOR HOME NAVIGATION

(71) Applicant: Google Inc., Mountain View, CA (US)

(72) Inventor: John Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 14/109,775

(22) Filed: Dec. 17, 2013

(65) Prior Publication Data

US 2015/0169071 A1    Jun. 18, 2015

(51) Int. Cl.
*G06F 3/0488* (2013.01)
*G06F 3/0485* (2013.01)
*G06F 3/01* (2006.01)

(52) U.S. Cl.
CPC .......... *G06F 3/04883* (2013.01); *G06F 3/017* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 7,663,607 B2 | 2/2010 | Hotelling et al. | |
| 7,920,131 B2 | 4/2011 | Westerman | |
| 8,732,617 B1 * | 5/2014 | Armstrong | G06F 3/04817 715/711 |
| 2006/0224989 A1 * | 10/2006 | Pettiross | G06F 3/0483 715/779 |
| 2007/0038963 A1 * | 2/2007 | Moore | G05B 23/0267 715/859 |
| 2007/0220444 A1 | 9/2007 | Sunday et al. | |
| 2011/0138314 A1 * | 6/2011 | Mir | G06F 9/4445 715/779 |
| 2011/0164056 A1 * | 7/2011 | Ording | G06F 1/1694 345/649 |

(Continued)

FOREIGN PATENT DOCUMENTS

WO    WO-2012/166176 A1    12/2012

OTHER PUBLICATIONS

Nels Dzyre's online posting ("Dzyre"), "10 Android Apps for Faster App-Switching," as archived and published on Jun. 1, 2012, <URL=https://web.archive.org/web/20130618093636/http://www.hongkiat.com/blog/androidappswitcher>.*

*Primary Examiner* — Doon Chow
*Assistant Examiner* — James T Tsai
(74) *Attorney, Agent, or Firm* — McDermott Will & Emery LLP

(57) ABSTRACT

Methods for navigating to a home screen and providing switching, launching, and notifications from the home screen are provided. An example method may include detecting a swiping gesture originating proximate to a top edge of a touchscreen display of a mobile device and extending away from the top edge. The method may further include, in response to detecting the swiping gesture, displaying at least a portion of a home screen extending from the top edge into an area of the touchscreen display. In addition, the home screen may include a plurality of interface items associated with active applications and applications available for launch. Systems, devices, and computer-readable media are also described.

19 Claims, 7 Drawing Sheets

(56) References Cited

U.S. PATENT DOCUMENTS

| | | | |
|---|---|---|---|
| 2011/0209097 A1* | 8/2011 | Hinckley | G06F 3/0483 |
| | | | 715/863 |
| 2011/0209098 A1 | 8/2011 | Hinckley et al. | |
| 2011/0252381 A1* | 10/2011 | Chaudhri | G06F 3/04883 |
| | | | 715/838 |
| 2011/0260829 A1 | 10/2011 | Lee | |
| 2012/0030625 A1* | 2/2012 | Miyazaki | G06F 3/0488 |
| | | | 715/830 |
| 2012/0036473 A1* | 2/2012 | Haseyama | G06F 3/016 |
| | | | 715/784 |
| 2012/0056832 A1* | 3/2012 | Miyazaki | G06F 3/04883 |
| | | | 345/173 |
| 2012/0165076 A1 | 6/2012 | Yu et al. | |
| 2012/0174005 A1* | 7/2012 | Deutsch | G06F 3/04817 |
| | | | 715/764 |
| 2012/0210273 A1* | 8/2012 | Seong | G06F 3/0488 |
| | | | 715/790 |
| 2012/0284673 A1* | 11/2012 | Lamb | G06F 3/04883 |
| | | | 715/863 |
| 2012/0309511 A1* | 12/2012 | Chung | H04N 21/274 |
| | | | 463/30 |
| 2012/0327025 A1 | 12/2012 | Huska et al. | |
| 2013/0179840 A1 | 7/2013 | Fisher et al. | |
| 2013/0297308 A1* | 11/2013 | Koo | G06F 3/167 |
| | | | 704/235 |
| 2014/0075286 A1* | 3/2014 | Harada | G06F 3/04886 |
| | | | 715/234 |
| 2014/0075332 A1* | 3/2014 | Jeon | H04M 1/72552 |
| | | | 715/752 |
| 2014/0101609 A1* | 4/2014 | Bamford | G06F 3/0484 |
| | | | 715/810 |
| 2014/0298190 A1* | 10/2014 | Barrus | G06F 3/0485 |
| | | | 715/741 |
| 2015/0169146 A1* | 6/2015 | Lalwani | G06F 3/0482 |
| | | | 715/811 |

\* cited by examiner

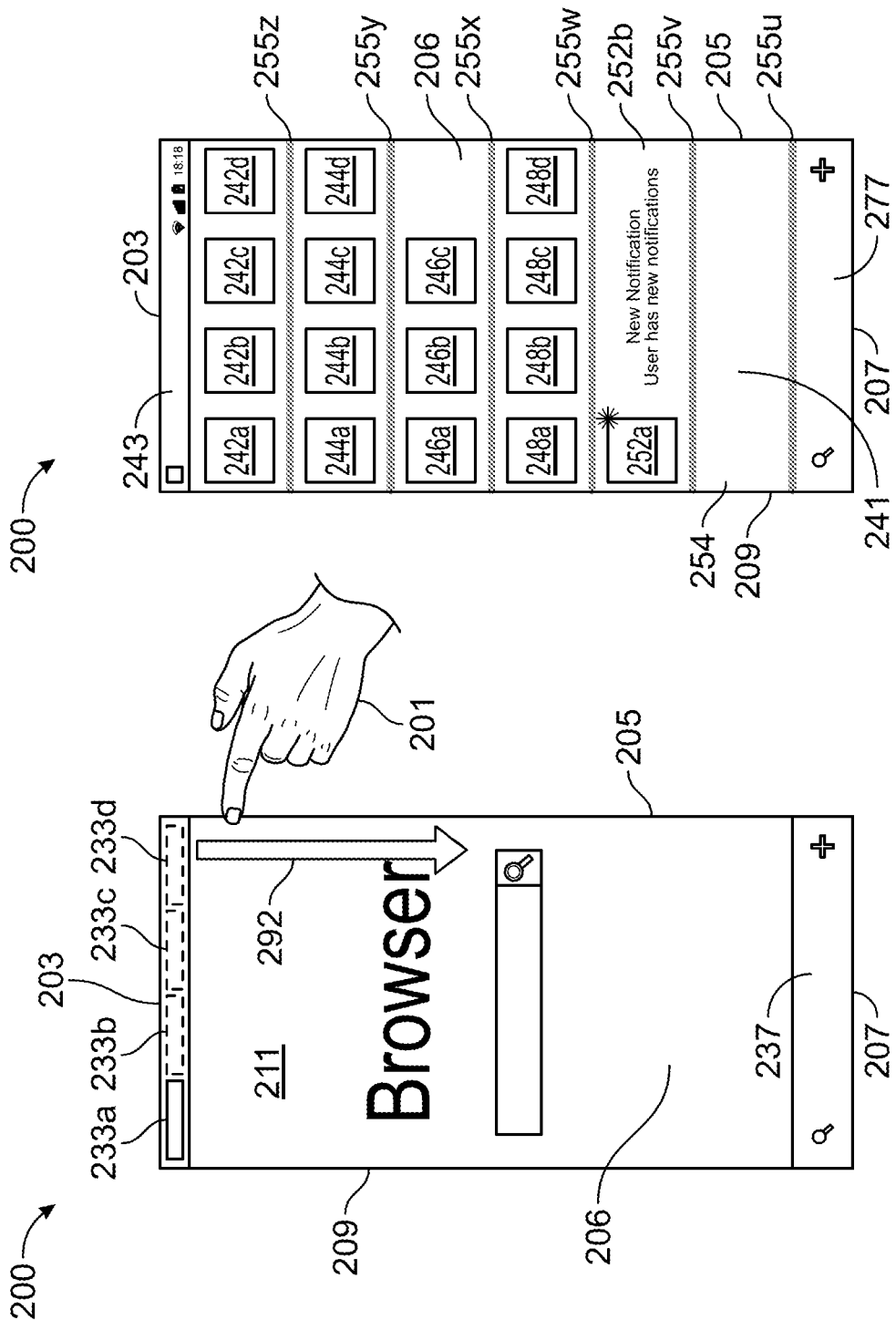

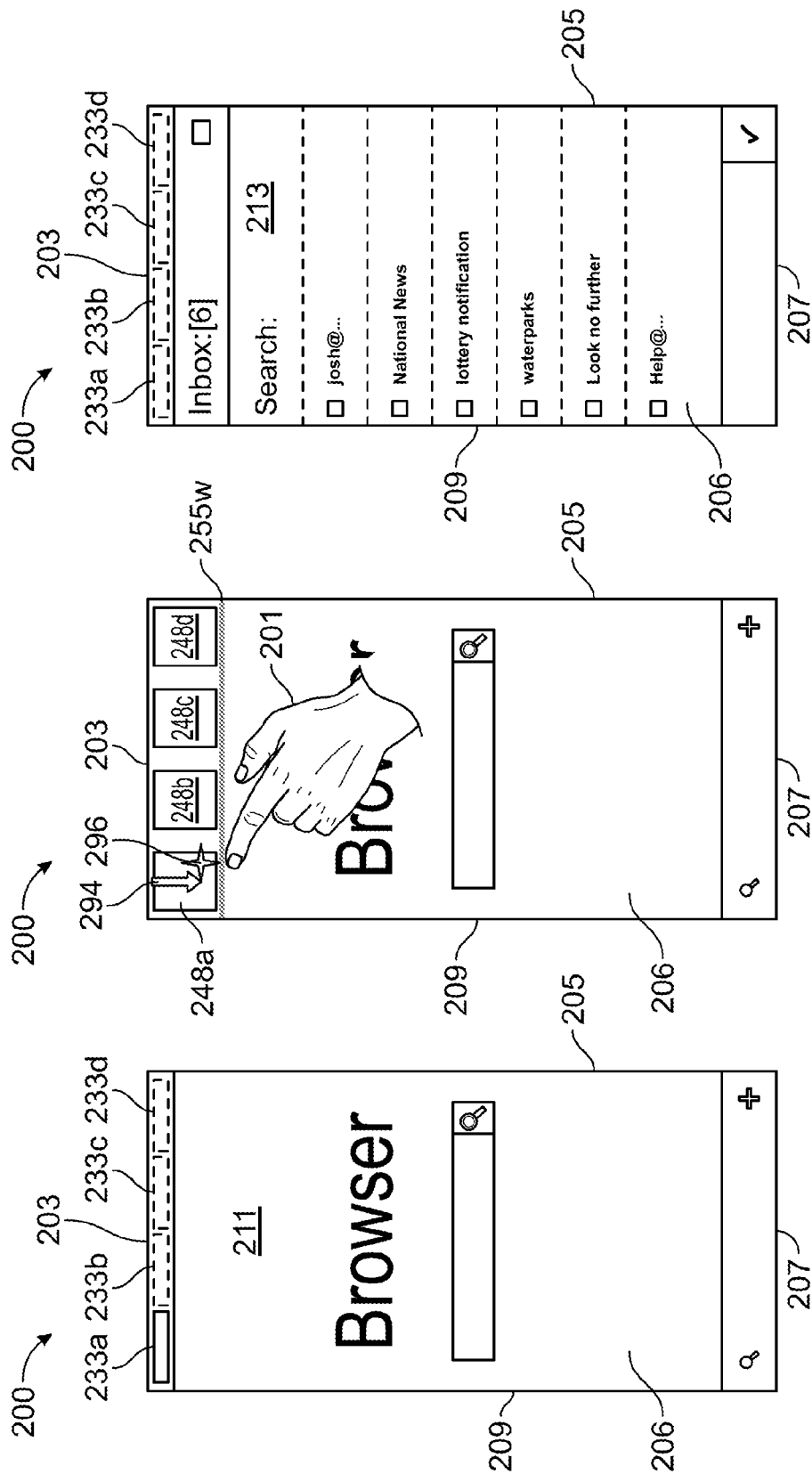

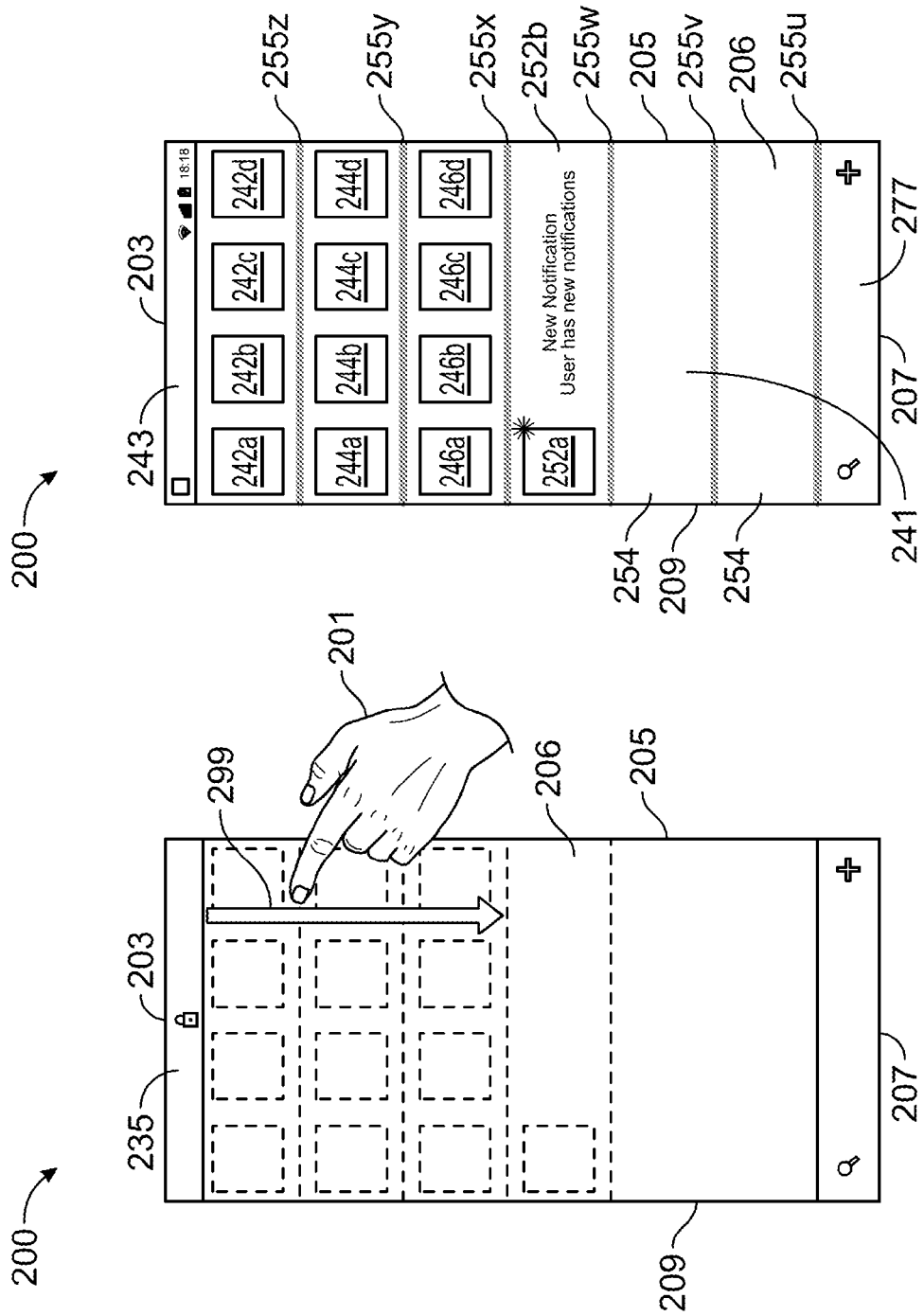

EDGE SWIPING GESTURE FOR HOME NAVIGATION

BACKGROUND

Activation of home screens on mobile devices has traditionally been accomplished with the use of buttons. The buttons are generally positioned adjacent to a display screen of the mobile device. At least one button is typically used to return the display screen of the mobile device to a home screen, desktop area, or control center.

In many instances, the buttons of the mobile device are disposed below or near a bottom edge of the display screen. Additionally, text concerning functions (e.g., Select, More, Back, or Exit) can be generated on the display screen above a particular button on some mobile devices to go back to a home screen and then to another application.

SUMMARY

The present disclosure relates generally device operating systems, and more particularly to systems and techniques related to navigating to a home screen and providing functionality therefrom.

In accordance with certain aspects, the disclosed subject matter relates to computer-implemented methods for navigating to a home screen and providing switching, launching, and notifications from the home screen. It is to be understood that various implementations of the subject technology may include any, all, or none of the following features. An example method may comprise detecting a swiping gesture originating proximate to a top edge of a touchscreen display of a mobile device and extending away from the top edge. The method may further comprise, in response to detecting the swiping gesture, displaying at least a portion of a home screen extending from the top edge into an area of the touchscreen display. In addition, the home screen comprises a plurality of interface items associated with active applications and applications available for launch.

The disclosed subject matter further relates to systems for navigating to a home screen and providing switching, launching, and notifications from the home screen. An example system or device may comprise a touchscreen display, one or more processors, and a memory including instructions that, when executed by the one or more processors, cause the one or more processors to perform operations. The one or more processors of the system may be configured to detect a swiping gesture originating proximate to a top edge of and extending away from the top edge. The one or more processors of the system may be further configured to determine whether the device is in a locked mode or an unlocked mode. In addition, the one or more processors of the system may be configured to in response to the detected swiping gesture, display, when the device is determined to be in the unlocked mode, at least a portion of a home screen extending from the top edge into an area of the touchscreen display, and display, when the device is determined to be in the locked mode, one of the home screen or a user interface for unlocking the device.

The disclosed subject matter also relates to example machine-readable media comprising instructions stored therein, which when executed by a machine, cause the machine to perform operations. An example machine-readable medium may comprise instructions for detecting a swiping gesture originating proximate to a top edge of a touchscreen display of a mobile device and extending away from the top edge. In addition, the machine-readable medium may comprise instructions for displaying, in response to detecting the swiping gesture, at least a portion of a home screen extending from the top edge into an area of the touchscreen display, wherein the home screen comprises a plurality of interface items associated with active applications and applications available for launch.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

FIGS. 2A-2G illustrate examples of navigating to a home screen and home screen switching, launching, and notification techniques in accordance with various aspects of the subject technology.

DETAILED DESCRIPTION

Figure 1:
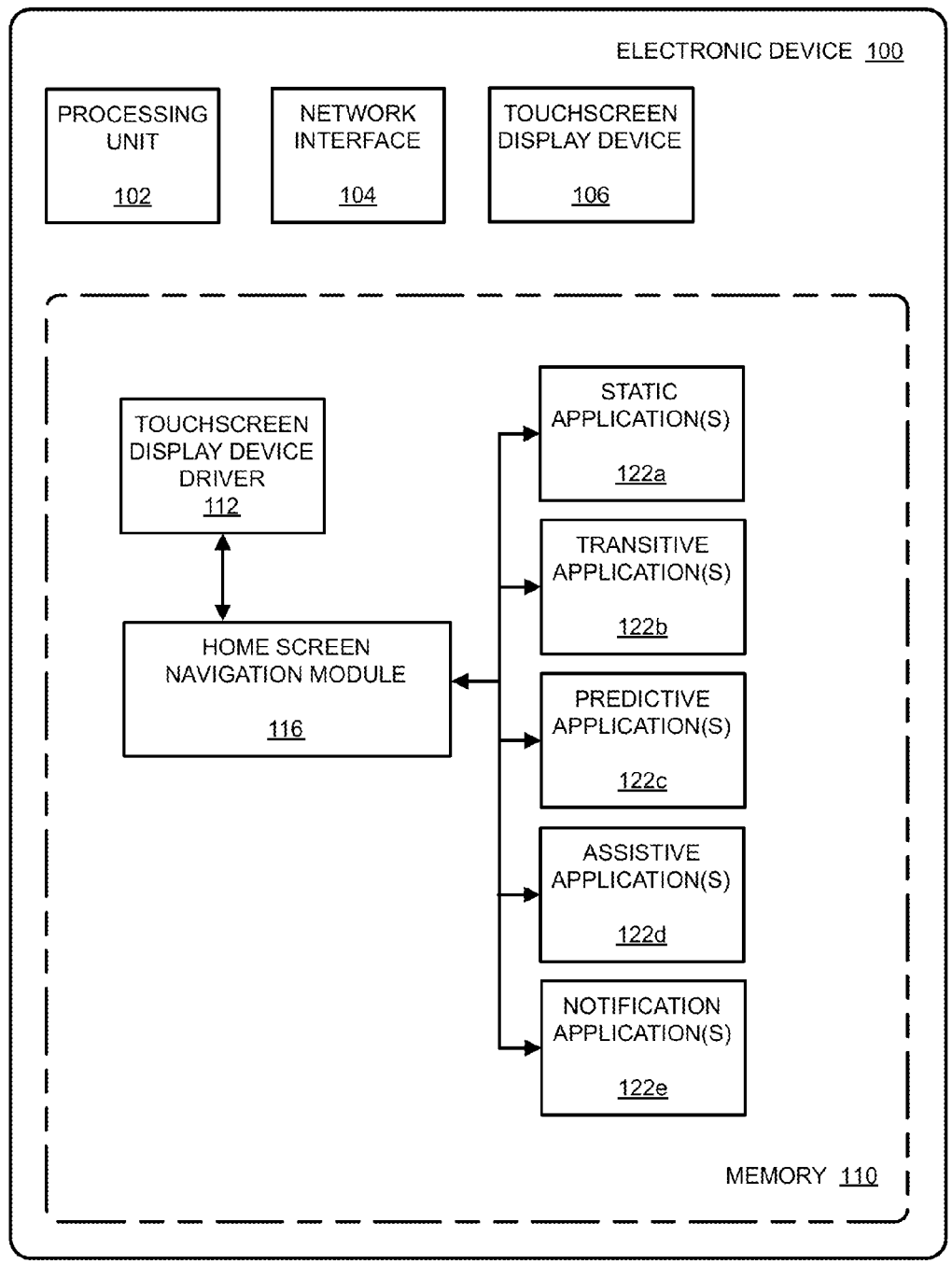
FIG. 1 illustrates an example of an electronic device for providing navigation to a home screen and functionality therefrom in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

In accordance with various aspects of the subject technology, systems and techniques for navigating to a home screen and providing switching, launching, and notifications from the home screen are described herein.

A swiping gesture originating from a top edge of a touchscreen display of a mobile device is used to navigate to a home screen of the mobile device in accordance with certain aspects of the subject technology. For example, home navigation swiping gestures may originate from the top edge and extend in a direction substantially orthogonal to the top edge toward the bottom edge of the touchscreen display (e.g., pulling down motion from the top edge). The touchscreen display may determine a rate of a particular home navigation swiping gesture (e.g., a fast or slow swiping motion) as well as detect a stoppage of the gesture.

The home screen may provide groupings of interface items (e.g., application icons, notification messages, information displays, etc.). In this regard, the interface items may be grouped in a gradient fashion such that only a limited number determined to be the most important and/or most often used are presented on the home screen. In some aspects, such groupings of home screen interface items may be presented in static, transitive, predictive, and assistive arrangements. In other aspects, the home screen can provide one or more notification areas.

For example, a static grouping of interface items may refer to one or more interface items appearing on the home screen each time the user navigates to the home screen. A static grouping may appear in the same place each time the user navigates to the home screen, however, such an arrangement may be modified by a user or system or a mobile device. In accordance with some aspects, a transitive grouping of interface items may refer to one or more recently-accessed interface items. For example, four interface items representing four applications that are presently running on a mobile device may represent the transitive group.

A predictive grouping of interface items may refer to one or more interface items predicted to be selected by the user in accordance with certain aspects. For example, a predictive grouping may include an interface item associated with a news application that the user of the mobile device regularly uses during a particular time of the day. In another example, a predictive grouping may include an interface item associated with a social networking application that the user of the mobile device regularly uses after using a particular blogging application (e.g., applications having similar temporal contexts).

Additionally, an assistive grouping of interface items may refer to one or more interface items associated with operating system or control function of the mobile device (e.g., settings, search, help, etc.). In some aspects, a particular interface item may correspond to one or more of the groupings describe above, and may accordingly be positioned within multiple groupings at different locations on the home page. In other aspects, the particular interface item corresponding to one or more of groupings may be positioned within only one grouping deemed to be the most relevant grouping on the homes screen.

In accordance with certain aspects, when a home navigation swiping gesture is detected, a home screen may fill the entirety of the touchscreen display or may only reveal certain portions extending from the top edge of the touchscreen display (e.g., stopping at one or more detent bands) based on the swiping gesture and associated motions performed by the user. Moreover, the groupings may be arranged in various places on the home screen. For example, a transitive grouping of interface items may be revealed as the first grouping from the top edge. In this regard, by placing the interface items of presently running applications on the first revealed portion of the home screen and including detent stop functionality, fast switching between applications may be realized. Accordingly, cross-application navigation or switching may be performed by a contiguous swiping and tapping gesture.

It is to be understood that the top edge of the touchscreen display may be a relative position in certain implementations of the subject technology. For example, the top edge associated with home navigation swiping gestures may refer to the top edge relative to the display orientation of the generated on the touchscreen display. The generated display orientation may be configured in a portrait orientation or a landscape orientation, for example.

Consequently, a top edge of the touchscreen display for purposes of home navigation swiping gestures can change during use of the mobile device. In other implementations, however, a top edge of the touchscreen display for purposes of home navigation swiping gestures can be locked to a particular edge of the touchscreen display irrespective of a display orientation generated thereon.

According to some aspects, one or more indicator segments may be aligned along the top edge of the touchscreen display (e.g., a series of connected line segments or strips along the top edge discernible from any generated background graphics). The one or more indicator segments may serve to orient or remind a user of the home navigation functionality associated with the mobile device. In some aspects, the one or more indicator segments may further be used to provide certain communications or notifications to the user. Such indicator segment communications may include, for example, flashing and/or changing colors, and therefore provide valuable real-time information relating to certain aspects of the home screen or applications. In some implementations, however, indicator segments may not be displayed. For example, a user may be knowledgeable to the home screen navigation functionality and/or prefer not to obscure an image or video generated on the touchscreen display.

It is to be understood that home navigation swiping gestures may be utilized at any time and while any application is running on the mobile device in accordance with certain implementations. Moreover, home navigation swiping gestures may be designed to be substantially similar to a swiping gesture used to unlock the screen of the mobile device. In this regard, familiarity and correlation between like operating system level activities on the part of the user may result in more precise and efficiently repeated top edge gestures.

Consequently, the subject technology provides advantages such as, but not limited to the following. In some aspects, because no home navigation button is required on the mobile device, valuable device surface area can be utilized for other purposes (e.g., edge to edge display, front surface cameras, front surface speakers, etc.). In some implementation, a mobile device utilizing the subject technology may be devoid of any buttons, perhaps with the exception of side mounted volume buttons, for example.

In certain aspects, only a de minimis portion of the touchscreen display area is utilized for home screen navigation purposes. Moreover, in implementations where no indicator segments are displayed, no portion of the display area (or the entire front face of the mobile device in some implementations) is utilized or such home navigation purposes.

In yet other aspects, utilizing the top edge of the touchscreen display may enable applications on the mobile device to utilize more display area and avoid interfering with other touchscreen gestures that may be intuitively associated with certain applications. For example, a book reader or web browsing application can maintain a natural left to right and right to left swiping gesture for page turning. In this regard, unintended home screen activations caused by similar touchscreen gestures and/or similarly positioned touchscreen display items may be greatly reduced if not eliminated.

FIG. 1 illustrates an example of an electronic device 100 that may be used to implement home navigation swiping gestures and providing switching, launching, and notifications from a home screen. Electronic device 100 may be a computing device such as, but not limited to, a mobile phone, a laptop computer, a notebook computer, a tablet computer, a personal digital assistant (PDA), a portable media player, or other devices comprising touchscreen displays with one or more processors coupled thereto or embedded therein, or other appropriate devices that include touchscreen displays and can be used to for switching and launching applications.

In certain examples, electronic device 100 includes a processing unit 102, a network interface 104, a touchscreen display device 106, and memory 110. Processing unit 102 includes one or more processors, and may include a central processing unit (CPU), a graphics processing unit (GPU), or any other processing unit. Processing unit 102 is configured to execute computer instructions that are stored in a computer-readable medium (e.g., memory 110).

Network interface 104 is configured to transmit and receive data in a network. In certain examples, the network can include any one or more of a personal area network (PAN), a local area network (LAN), a campus area network (CAN), a metropolitan area network (MAN), a wide area network (WAN), a WiFi network, a broadband network (BBN), the Internet, a cellular network, and the like. The network may also include, but is not limited to, any one or more of the following network topologies, including a bus network, a star network, a ring network, a mesh network, a star-bus network, a tree or hierarchical network, and the like. The network interface 104 may include one or more network interface controllers (NICs) operable to communicate various networks, for example.

Touchscreen display device 106 is configured to display information to a user of the electronic device 100. The touchscreen display device 106 is further configured to allow a user of the electronic device 100 to provide input to the electronic device 100. The touchscreen display device 106 may be a component of the electronic device 100 or may be coupled to the electronic device 100 and reside externally thereto. In some examples, touchscreen display device 106 may include one or more portions having a monitor or a screen, in addition to touchscreen capability. Touchscreen display device 106 may include a single-touch touchscreen or a multi-touch touchscreen in accordance with some implementations. Moreover, in some implementations, electronic device 100 may include other display devices and input devices in addition to the touchscreen display device 106.

In the example of FIG. 1, memory 110 of electronic device 100 stores data and/or instructions. Memory 110 may be one or more of a cache unit, a storage unit, an internal memory unit, or an external memory unit. As illustrated, memory 110 includes a touchscreen display device driver 112, a home screen navigation module 116, and data associated with various applications 122a-e.

Touchscreen display device driver 112 is configured to transmit data to the touchscreen display device 106 for presentation at the touchscreen display device 106. The touchscreen display device driver 112 is also configured to receive input data (e.g., movement information or touch information) from the touchscreen display device 106.

Moreover, in certain implementations, touchscreen display device 106 and corresponding touchscreen display device driver 112 may utilize one or more processors of processing unit 102 that are distinct from one or more processors of the processing unit 102 that operate as the main processing engine of electronic device 100 (e.g., distinct and dedicated processors for touchscreen operations and functionality). However, in other implementations, touchscreen display device 106 and corresponding touchscreen display device driver 112 may share one or more processors of processing unit 102 that operate as the main processing engine of electronic device 100.

It is to be understood that touchscreen display device 106 may include various touchscreen technology and techniques. For example, touchscreen display device 106 may include touchscreen display devices that send out a signal indicating one or more positions of touch on the touchscreen to a controller or processor that uses multiple "snapshots" or indications of touches to determine the type and location of gestures on the touchscreen. In other implementations, touchscreen display device 106 may include touchscreen display devices that include a controller and determine the type and location of gestures made on the touchscreen display.

Memory 110 can store data associated with various applications. The associated data may be readily accessible and/or modified by home screen navigation module 116. For example, memory 110 may store data associated with interface items, home screen placement of interface items, and application status corresponding to one or more static applications 122a, one or more transitive applications 122b, one or more predictive applications 122c, one or more assistive application 122d, or one or more notification applications 122e. While applications 122a-e are illustrated in the example of FIG. 1, the subject technology may include any number and type of applications.

Each application stored in or accessible by the electronic device 100 may have a corresponding interface item (e.g., an application icon) stored in memory 110 and may be associated with more than one classification of applications (e.g., a text messaging application may be deemed both a notification application and determined to be a predictive application in accordance with the subject technology).

Home screen navigation module 116, when executed, can cause processing unit 102 to display, via touchscreen display device 106, a home screen or portions thereof including interface items associated with one or more applications 122a-e. The home screen navigation module, when executed, can cause processing unit 102, to correlate previous user home screen activity to predict which interface items a user may wish to utilize and to arrange the interface items in various manners for display on the home screen.

The home screen navigation module 116, when executed, can also cause processing unit 102 to provide, via touchscreen display device 106, switching, launching, and notifications from the home screen. A user interacting with the touchscreen display device 106 of electronic device 100 may perform various home navigation swiping gestures to cause the home screen navigation module 116 to be executed, for example.

Techniques for navigating to a home screen and providing switching, launching, and notifications from the home screen are further described below with respect to FIGS. 2A-G, 3, and 4 and continued reference to FIG. 1.

FIGS. 2A-2G illustrate examples of navigating to a home screen and home screen switching, launching, and notification techniques.

As shown in the example of FIG. 2A, user 201 is using mobile device 200 configured in accordance with various aspects of the subject technology. Touchscreen display 206 of the mobile device 200 includes a first edge 203 (e.g., top edge), a second edge 205 (e.g., right edge), a third edge 207 (e.g., bottom edge) that is parallel to the first edge 203, and a fourth edge 209 (e.g., left edge) that is parallel to the second edge 205. The touchscreen display 206 may be generally rectangular in shape whereby the first and third edges 203, 207 are the same lengths and shorter than the second and fourth edges 205, 209, which are also the same lengths. In other implementations, a touchscreen display may be shaped, for example, in a square or with one or more arcuate edges. However, a top edge should be definable either from the geometry of the touchscreen display (and associated device) or images displayed thereon.

User 201 may search for and browse a website with browser application 211. One or more indicator segments 233*a-d* may be aligned along the top edge of the touchscreen display 206, and indicator segment 233*a* may illuminate indicating to user 201 that a new notification has been received, for example. In certain implementations, indicator segment 233*a* may flash or pulse and change colors, for example, assuming a predominant color associated with an application motif of the application for which the indication relates. User 201 may perform a home navigation swiping gesture 292 to reveal a home screen 241 (FIG. 2B). In certain examples, the home navigation swiping gesture 292 originates at or proximate to the top edge of the touchscreen display 206. The home navigation swiping gesture 292 may then extend in a direction substantially orthogonal to the top edge toward the bottom edge of the touchscreen display 206. The home navigation swiping gesture 292 may originate from any point along or proximate to the top edge and extend downwardly from that point toward the bottom edge.

Touchscreen display 206 may determine a rate of a particular home navigation swiping gesture (e.g., a fast or slow swiping motion). For example, a slow and long dragging gesture from the top edges down toward and proximate to the bottom edge may indicate user intent to display an entirety of home screen 241 as shown in FIG. 2B. Similarly, a fast and short flicking gesture from the top edge of the touchscreen display 206 may also indicate user intent to display an entirety of home screen 241.

Home screen 241 of mobile device 200 can be revealed by the home navigation swiping gesture 292. The home screen 241 includes various application that may be active or available for launch in the example of FIG. 2B. In certain examples, the home screen 241 may include one or more groupings of interface items such as, but not limited to, an assistive grouping of interface items 242*a-d*, a static grouping of interface items 244*a-d*, a predictive grouping of interface items 246*a-c*, a transitive grouping of interface items 248*a-d*, and a notification grouping of interface items 252*a*, 252*b*.

Home screen 241 may also include home screen bar 243 and control bar 277. Home screen bar 243 may provide various operating systems and general information and indications such, but not limited to, time of day, date, signal type and strength, battery power remaining Control bar 277 may provide for performing search functions for applications and for access to view all applications and features available on the mobile device 200. In certain examples, home screen bar 243 and control bar 277 may only appear when the entirety of the home screen 241 is displayed (e.g., as shown in FIG. 2B). However, in some examples, home screen bar 243 or control bar 277 (or a similar bar combining functionality of both) may be a first revealed portion of the home screen 241 and may provide information to the user 201 accessible with a quick peek of the home screen 241 (e.g., a clock, an incoming call, a missed call, a missed text message, etc.). Such an implementation may be utilized, for example, when a home screen bar or the like is not used in conjunction with an open application (e.g., when the touchscreen display area associated with the open application is maximized for viewing a video or other images).

One or more detent bands 255*u-z* may be utilized as borders for the various groupings of interface items arranged on the home screen 241. In some examples, the one or more detent bands 255*u-z* may not be visually displayed, but rather the one or more detent bands 255*u-z* may simply be stopping points or demarcations at which the home screen 241 may jump to as the home navigation swiping gesture proceeds down the touchscreen display. In certain implementations, the one or more detent bands 255*u-z* correspond to fixably movable aspects of the home screen 241. For example, a portion (e.g., one or more adjacent groupings of interface items) of the home screen 241 may be revealed during a home navigation swiping gesture and remain in place (e.g., a swipe from the top edge of touchscreen display 206 and pause when a detent band 255 substantially aligns with the top edge) while the application presently being used remains viewable on the portion. Additional portions of the home screen 241 can be revealed, for example, by touching a section of the home screen 241 (e.g., an area without interface items such as a detent band 255 or an area of a control bar 277) and further sliding the home screen 241 toward the bottom edge until another detent 255 is aligned reached or the entirety of the home screen 241 is displayed on the touchscreen display 206.

An example of cross-application switching and launching utilizing a home navigation swiping gesture and one or more detent bands 255*u-z* of home screen 241 is illustrated in FIGS. 2C-2E.

User 201 of mobile device 200 may be using browser application 211 and be alerted by indicator segment 233*a* of the one or more indicator segments 233*a-d* displayed along the top edge of the touchscreen display 206. For example, indicator segment 233*a* may momentarily flash or pulse a predominant color associated with an application motif of an email application installed on the mobile phone 200. Of course, user 201 may wish to switch active applications or launch a new application regardless of any indication by the one or more indicator segments 233*a-d*.

User 201 may make a home navigation swiping gesture 294 while browser application 211 is open and actively displayed on the touchscreen display 206. The home navigation swiping gesture 294 can be a short swipe originating at or near the top edge (e.g., first edge 203 corresponding to the device orientation shown in FIG. 2C) of the touchscreen display 206. Thus, the home navigation swiping gesture 294 can reveal a portion of the home screen 241 over the upper portion of the open and active browser application 211. User 201 may slow or suspend the swiping motion when detent band 255*x* substantially aligns with the top edge or the application of interest has been reveal such that detent band 255*x* will snap into place.

In some examples, slowing or suspending the swiping motion of home navigation swiping gesture 294 at or near detent band 255*x* will allow the portion of the home screen revealed to remain displayed on the touchscreen display 206 when contact is removed from the touchscreen display 206. In accordance with some aspects of the subject technology, the open and active remaining portion of the application (e.g., the lower portion of browser application 211) is operable and can be utilized by the user while the first revealed portion of the home screen is also displayed. It is to be understood that a first revealed portion of the home screen may comprise a first row of interface items in some implementation as illustrated in the example of FIG. 2D. However, in other implementations, the first revealed portion of the home screen may comprise several rows of interface items.

Next, user 201 may perform a tapping motion 296 on interface item 248a to switch to or launch corresponding email application 213 (e.g., associated with an email account for which new mail was received). If, for example, email application 213 was related to the alert or indication associated with the indicator segment 233a as illustrated in FIG. 2C, then whatever notification technique utilized to distinguish indicator segment 233a may be removed such that indicator segment 233a appears similar to the other indicator segments 233b, 233c, 233d as illustrated in FIG. 2E.

It is to be understood that while a transitive grouping of interface items 248a-d (e.g., corresponding to presently running or active applications) is illustrated as a first revealed portion of the home screen 241 in the example of FIG. 2D, other groupings (e.g., a predictive grouping of interface items 246a-d or a notification grouping of interface items 252a, 252b) or one or more interface items related to multiple grouping classifications may be provided as a first revealed portion of the home screen 241.

Other examples of cross-application switching and launching can be understood from FIGS. 2C-2E and the above cross-application switching example. For example, indicator segment 233c may illuminate or otherwise alert the user to an application in the column associated with indicator segment 233c (e.g., interface item 242c, interface item 244c, interface item 246c, or interface item 248c as illustrated in FIG. 2B) that are longitudinally aligned on the touchscreen display in a similar manner as indicator segment 233c. User may then make a home navigation swiping gesture originating at or near the top edge (e.g., anywhere along the top edge) of the touchscreen display 206 and reveal the entire home screen or enough of the home screen to view the desired interface item (e.g., stopping when detent band 255x generally aligns at the top edge to reveal interface item 244c). Then, the user may tap on the desired interface item to switch to (if active) or launch (if inactive) the application corresponding to the desired interface item.

As noted above, home screen bar 243 or control bar 277 (or a similar bar combining functionality of both) may be a first revealed portion of the home screen 241 during a home navigation swiping gesture. For example, a first revealed home information bar may be positioned before or in place of detent band 255w as shown in FIG. 2D so that a user may obtain a quick peek of general home screen, application-specific, and/or operating system details when desired. However, such valuable display screen real estate would not be taken for such details when an application is active and running in accordance with certain aspects.

FIGS. 2F and 2G illustrate an association between certain unlocking gestures and home navigation swiping gestures. For example, mobile device 200 may enter a locked mode such that a lock bar 235 must be engaged in some manner to unlock the device. In certain examples, the lock bar 235 is positioned along a top edge (e.g., first edge 203) of touchscreen display 206. In some implementations, lock bar 235 may always be aligned along the first edge 203 regardless of device orientation. Moreover, while in the locked mode, interface items on home screen 241 may be dimmed but visibly displayed behind a shade screen of the locked mode. However, in other examples, the home screen may not be visible and may display other information or nothing at all.

In certain examples, unlocking gesture 299 by user 201 as illustrated in FIG. 2F can be a similar gesture as would be used for home navigation swiping gestures (e.g., home navigation swiping gesture 292 in FIG. 2A or home navigation swiping gesture 294 in FIG. 2D) for mobile device 200. When unlocking gesture 299 is performed by user 201, home screen 241 may be revealed as illustrated in FIG. 2G. Alternatively, an unlock user interface may appear on the touchscreen display 206 such that the user 201 must enter a correct password prior to the home screen 241 being revealed.

Figure 3:
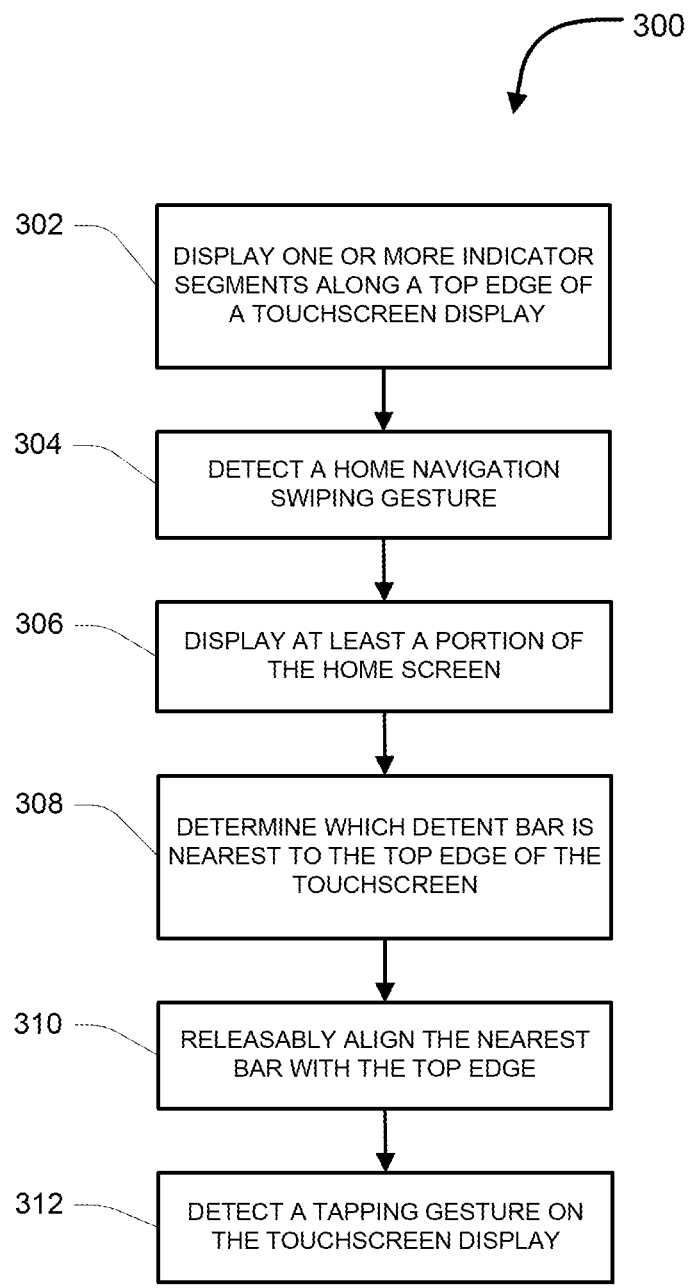
FIG. 3 is a flow diagram illustrating an example process for navigating to a home screen and performing functions associated with the home screen in accordance with various aspects of the subject technology.

FIG. 3 illustrates a flow diagram of an example process for navigating to a home screen and performing functions associated with the home screen. It is to be understood that the operations in process 300 may be used in conjunction with other processes and aspects of the present disclosure. Although process 300 is described with relation to the examples of FIGS. 1 and 2A-2G, process 300 is not limited to such.

In block 302, one or more indicator segments aligned along a top edge of a touchscreen display may be displayed on a mobile device (e.g., electronic device 100 or mobile device 200). The one or more indicator segments may be displayed in a manner to communicate information associated with the home screen and/or the applications or functions associated with the home screen. For example, the one or more indicator segments may be configured to display alerts, notification or the like in a manner to communicate a type of event (e.g., new email messages have been received) and/or a particular interface item (e.g., an icon associated with a browser application).

In some examples, a length along the top edge of a first indicator segment (e.g., indicator segment 233a in FIG. 2C) may generally correspond to a width of a first column of interface items (e.g., interface items 242a, 244a, 246a, 248a, 252a in FIG. 2B). As illustrated in the examples of FIGS. 2A-2G, columns of interface items may be longitudinally aligned on a home screen (e.g., home screen 241) with a position on the top edge of the touchscreen display that corresponds to a location of an indicator segment along the top edge. Therefore, in some examples, alert, notification or the like displayed with respect to the first indicator segment will corresponds to at least one of the interface items arranged in the first column.

In block 304, a home navigation swiping gesture may be detected. For example, the home navigation swiping gesture can be a swiping gesture originating proximate to a top edge of the touchscreen display of the a mobile device and extending away from the top edge generally toward and bottom edge of the touchscreen display. Contact by a user of the mobile device can be made by a fingertip, stylus, touch pen, or other implement.

In response to detecting a home navigation swiping gesture, at least a portion of the home screen of the mobile device may be displayed (block 306). For example, the portion of the home screen may extend from the top edge into an area of the touchscreen display. The home screen may comprise various images and items, for example, a plurality of interface items associated with active applications and applications available for launch. In some examples, the one or more indicator segments may be removed from the touchscreen display when the home screen navigation swiping gesture is detected.

In some examples, a group of the plurality of interface items associated with the active applications may be displayed as a first revealed portion of the home screen. In other examples, a group of the plurality of interface items associated with the applications available for launch may be displayed as a first revealed portion of the home screen. Interface items on the home screen may be activated or engaged in various ways such as performing a tapping motion on the touchscreen display or maintaining contact with the touchscreen display, for example.

In certain examples, an interface item associated with an application not active, but predicted for use at a time of the detecting the swiping gesture, may be displayed in a first revealed portion of the home screen. For example, a correlation may be determined that many times while a user is viewing a video application, the user will likely launch a text messaging application. Accordingly, if a home screen navigation gesture is detected while the user is actively viewing the video application, then an interface item corresponding to the text messaging application may be positioned at a first revealed portion of the home screen (e.g., the first group of interface items seen from the top edge extending into the area of the touchscreen display). Similarly, an interface item predicted for use during a certain time frame, may appear on the home screen at a next invocation of the home navigation edge gesture.

In other examples, an interface item associated with an application corresponding to an operating system function of the mobile device may be displayed with a first revealed portion of the home screen. For example, if a new version of an operating system is available to be downloaded or a certain setting is regularly used, the home screen may include such an operating system interface item within the first revealed portion of the home screen.

In certain examples, the home screen may comprises one or more information bars (e.g., home screen bar 243, control bar 277, or a bar combining functionality of both bar 243 and bar 277). Accordingly, an information bar may be displayed as a first revealed portion of the home screen.

In some examples, the home screen may comprise one or more detent bars. Each of the one or more detent bars may be aligned in parallel with the top edge of the touchscreen display, for example. A grouping of one or more interface items may be provided between adjacent or consecutive detent bars.

Block 308 may comprise determining which of the one or more detent bars is nearest the top edge when the home navigation swiping gesture has stopped or paused. For example, a user may guide a leading edge of the home screen into the area of the touchscreen display such that some, but not all groupings of interface icons may be shown while an application continues to run and be displayed on the remaining portion of the area of the touchscreen display. Accordingly, the nearest detent bar may be releasably aligning with the top edge to hold the first revealed portion in place (block 310). The home screen may be moved again thereafter, for example, by guiding the portion back into the top edge or pulling the portion down to the bottom edge so that the entirety of the home screen is revealed.

In block 312, a tapping gesture on the touchscreen display directed to a first interface item may be detected. The first interface item may be associated with a first application available for launch, for example. When the first interface item is tapped or otherwise selected by the user, the first application is launched, for example. In accordance with some aspects, when the first interface item associated with the launched first application, the first interface may be moved to a different position on the home screen. For example, the first interface icon may be moved from a grouping of predictive interface items to a grouping of interface items associated with the active or transitive applications.

Figure 4:
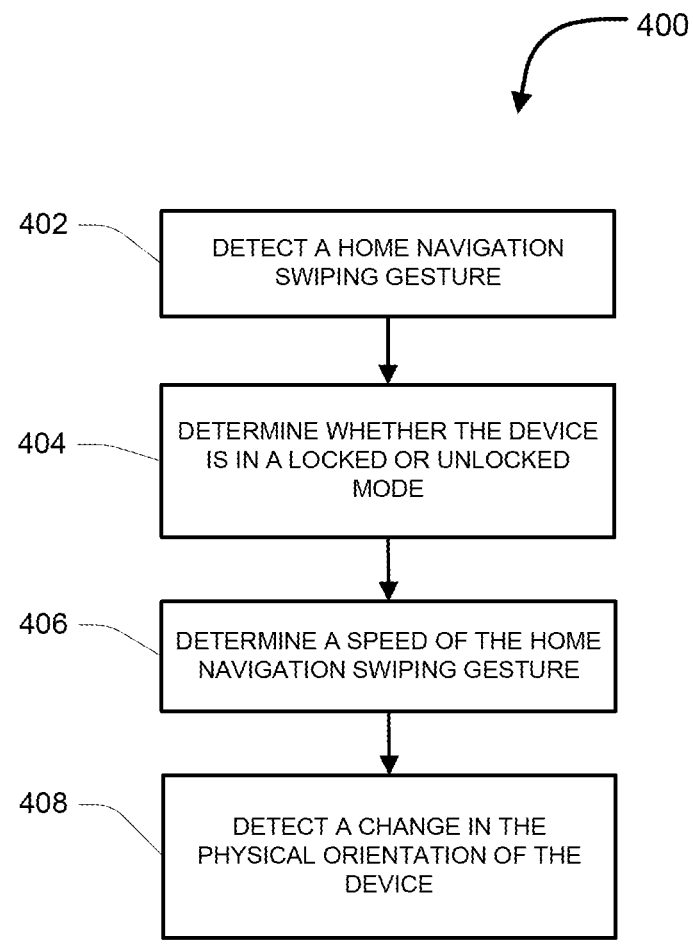
FIG. 4 is a flow diagram illustrating another example process for navigating to a home screen and performing functions associated with the home screen in accordance with various aspects of the subject technology.

FIG. 4 illustrates a flow diagram of an example process for navigating to a home screen and performing functions associated with the home screen. It is to be understood that the operations in process 400 may be used in conjunction with other processes and aspects of the present disclosure. Although process 400 is described with relation to the examples of FIGS. 1 and 2A-2G, process 400 is not limited to such.

In block 402, a home navigation swiping gesture may be detected. Block 404 may comprise determining whether the device is in a locked or unlocked mode. A response of the device (e.g., electronic device 100 or mobile device 200) may be different depending on the present mode of the device. For example, if the device is presently in the unlocked mode, at least a portion of a home screen extending from the top edge into an area of the touchscreen display may be displayed in response to the detected swiping gesture. However, if the device is determined to be in the locked mode, either the home screen or a user interface for unlocking the device (if such a feature has been enabled by the user) may be displayed.

In block 406, a speed of the home navigation swiping gesture may be detected. If the speed exceeds a threshold value (e.g., a speed and/or length of swipe associated with a fast and long downward flick of a finger on the touchscreen), then the entirety of the home screen may be displayed, for example, encompassing most or all of the display area associated with the touchscreen display. However, if the speed of the home navigation swiping gesture does not exceed the threshold value (e.g., a quick and short movement or a long and slow movement from the top edge), then only a portion of the home screen extending from the top edge will be displayed in accordance with certain aspects.

In block 408, a change in the physical orientation of the mobile device may be detected (e.g., with use of a gyroscope of the device). Accordingly, the device can determine if a slight canting or tilting the touchscreen display is such that a swiping gesture by the user is intended to be a home navigation swiping gesture or a different swiping gesture (e.g., a side swiping page turning gesture). In some implementation, the top edge used for the purpose of a home screen swiping gesture may be redefined such that a new top edge will be used for detecting a home navigation swiping gesture (e.g., second edge 205 of touchscreen display 206 when the mobile device 200 is rotated 90 degrees counter clockwise in the example of FIG. 2A). However, it is to be noted that the top edge used for detecting a home navigation swiping gesture may remain a constant edge on the touchscreen display in certain implementations.

Figure 5:
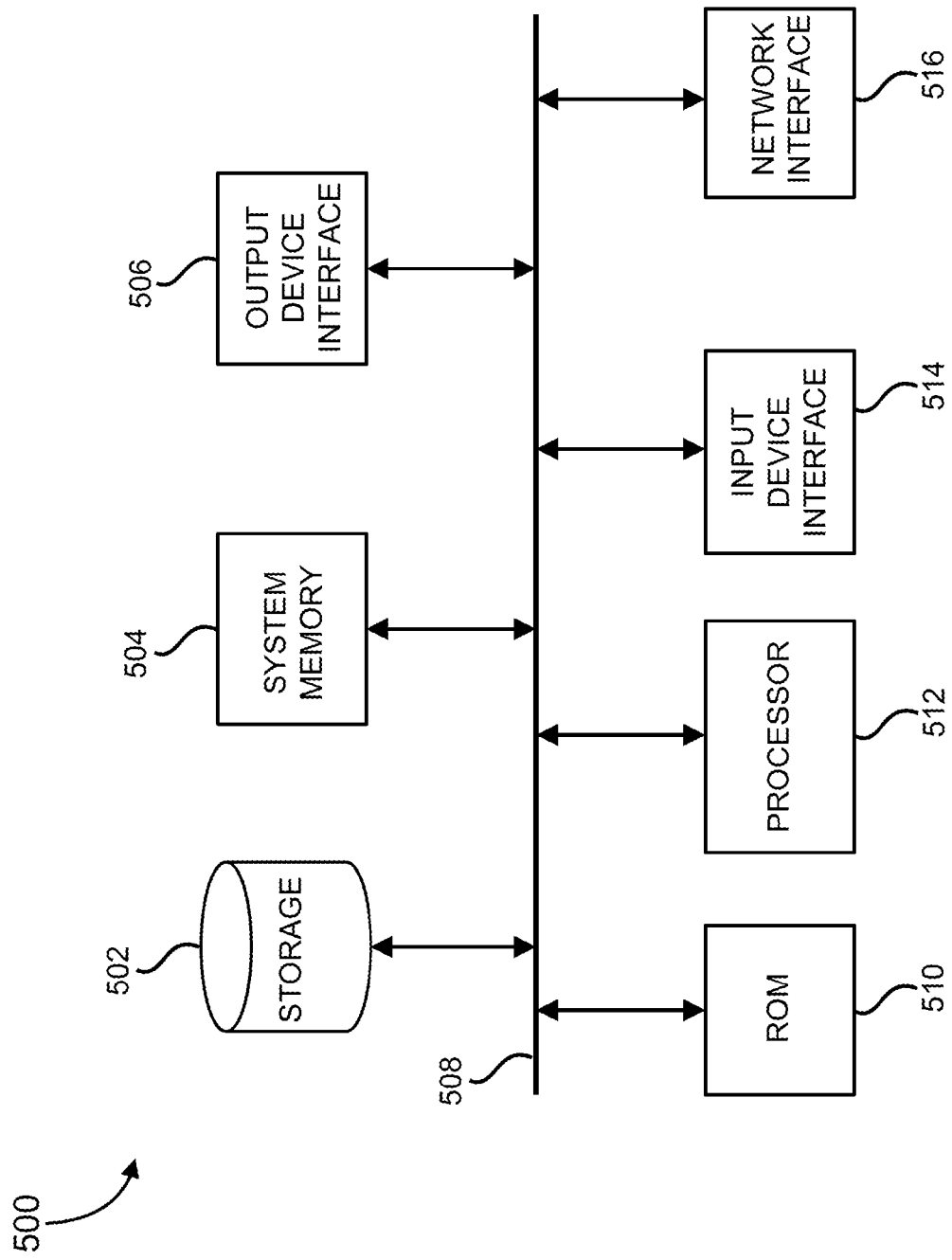
FIG. 5 conceptually illustrates an electronic system with which some aspects of the subject technology are implemented.

FIG. 5 conceptually illustrates an electronic system with which some implementations of the subject technology are implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units may include instructions for facilitating home screen navigation gestures in accordance with some implementations of the subject technology. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

As shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

For example, the instructions for performing various operations may be stored in the memory units and implemented in one or more computer program products, for example, one or more modules of computer program instructions encoded on a computer readable medium for execution by, or to control the operation of, the electronic system 600, and according to any method known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions for performing various operations may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Various memory units may also be used for storing temporary variable or other intermediate information during execution of instructions to be executed by processing unit(s) 512.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of operations described with respect to the blocks in the processes disclosed is an illustration of example approaches. Based upon design preferences, it is understood that the specific order or hierarchy of operations in the processes may be rearranged. Moreover, in some aspects and implementations, one or more of the operations in one or more blocks may not or need not be performed. Some of the operations in the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

What is claimed is:

1. A computer-implemented method comprising:
detecting, via one or more processors, a swiping gesture originating proximate to a top edge of a touchscreen display of a mobile device and extending away from the top edge;
determining a speed and length of the detected swiping gesture;
in response to the speed and length of the detected swiping gesture meeting first criteria, displaying a home screen comprising detent bars separating a plurality of groups of first interface items displayed on the home screen, each group comprising a different type of first interface items and having a fixed appearance between a respective set of the detent bars, the home screen overlapping an interface screen of currently displayed grouping of one or more second interface items, wherein each of the detent bars is aligned in parallel with the top edge of the touchscreen display; and
in response to the speed and length of the detected swiping gesture meeting second criteria, lowering the home screen from the top edge of the touchscreen display to over the interface screen according to the swiping gesture and the detent bars,
wherein in response to a release of the swiping gesture the lowering is stopped and a top one of the detent bars displayed nearest the top edge aligns with the top edge such that a revealed portion of the home screen is displayed from the top detent bar to a bottom of the home screen, and wherein the revealed portion of the home screen overlapping the interface screen with a portion of the interface screen is visible below the bottom of the home screen and operable to receive user input at one of the displayed second interface items.

2. The method of claim 1, wherein the plurality of groups of first interface items comprise a group of first interface items associated with applications available for launch.

3. The method of claim 1, wherein the plurality of groups of first interface items comprise a group of first interface items having an interface item associated with an application not active but predicted for use at a time of the detecting the swiping gesture.

4. The method of claim 1, wherein the plurality of groups of first interface items comprise a group of first interface items having at least one interface item associated with an operating system function of the mobile device.

5. The method of claim 1, wherein the home screen comprises an information bar, and wherein the revealed portion of the home screen comprises a display of the information bar as the revealed portion of the home screen is first revealed.

6. The method of claim 1, further comprising:
detecting a tapping gesture on the touchscreen display within the revealed portion of the home screen, wherein the tapping gesture is directed to a first interface item of one of the plurality of groups of first interface items, and wherein the first interface item is associated with a first application available for launch;
launching the first application; and
displaying the launched first application on an upper portion and a lower portion of the touchscreen display.

7. The method of claim 1, further comprising:
displaying one or more indicator segments aligned along the top edge of the touchscreen display.

8. The method of claim 7, wherein the one or more indicator segments are displayed in a manner to communicate information associated with the home screen, the method further comprising, in response to detecting the swiping gesture, removing the one or more indicator segments from the touchscreen display.

9. The method of claim 7, wherein the one or more indicator segments are displayed in a manner to communicate at least one of a type of event or a particular interface item associated with the home screen.

10. The method of claim 7, wherein a length along the top edge of a first indicator segment of the one or more indicator segments corresponds to a width of a first column of interface items of the plurality of groups of first interface items, wherein the first column is longitudinally aligned on the home screen with a position on the top edge of the touchscreen display that corresponds to a location of the first indicator segment along the top edge, and wherein an alert by the first indicator segment corresponds to an interface item arranged in the first column.

11. The method of claim 1, further comprising:
moving a first interface item associated with a launched first application from a current group to a group associated with active applications.

12. A device comprising:
a touchscreen display;
one or more processors; and
a memory including instructions that, when executed by the one or more processors, cause the one or more processors to:
detect a swiping gesture originating proximate to a top edge of and extending away from the top edge;
in response to the detected swiping gesture meeting first criteria, displaying a home screen comprising detent bars separating a plurality of groups of first interface items displayed on the home screen, each group comprising a different type of first interface items and having a fixed appearance between a respective set of the detent bars, the home screen overlapping an interface screen of currently displayed grouping of one or more second interface items, wherein each of the detent bars is aligned in parallel with the top edge of the touchscreen display; and
in response to the detected swiping gesture meeting second criteria, lowering the home screen from the top edge of the touchscreen display to over the interface screen according to the swiping gesture and the detent bars,
wherein in response to a release of the swiping gesture the lowering is stopped and a top one of the detent bars displayed nearest the top edge aligns with the top edge such that a revealed portion of the home screen is displayed from the top detent bar to a bottom of the home screen, and wherein the revealed portion of the home screen overlapping the interface screen with a portion of the interface screen is visible below the bottom of the home screen and operable to receive user input at one of the displayed second interface items.

13. The device of claim 12, wherein the home screen comprises a group of first interface items associated with active applications and a group of first interface items associated with applications available for launch.

14. The device of claim 12, wherein the instructions that, when executed by the one or more processors, further cause the one or more processors to:
  detect a change in a physical orientation of the device; and
  redefine the top edge of the touchscreen display in connection with the detecting a swiping gesture.

15. A non-transitory machine-readable medium comprising instructions stored therein, which when executed by a machine, cause the machine to perform operations, the machine-readable medium comprising:
  instructions for detecting a swiping gesture originating proximate to a top edge of a touchscreen display of a mobile device and extending away from the top edge;
  instructions for determining a speed and length of the detected swiping gesture;
  instructions for, in response to the speed and length of the detected swiping gesture meeting first criteria, displaying a home screen comprising detent bars separating a plurality of groups of first interface items displayed on the home screen, each group comprising a different type of first interface items and having a fixed appearance between a respective set of the detent bars, the home screen overlapping an interface screen of currently displayed grouping of one or more second interface items, wherein each of the detent bars is aligned in parallel with the top edge of the touchscreen display; and
  instructions for, in response to the speed and length of the detected swiping gesture meeting second criteria, lowering the home screen from the top edge of the touchscreen display to over the interface screen according to the swiping gesture and the detent bars,
    wherein in response to a release of the swiping gesture the lowering is stopped and a top one of the detent bars displayed nearest the top edge aligns with the top edge such that a revealed portion of the home screen is displayed from the top detent bar to a bottom of the home screen, and wherein the revealed portion of the home screen overlapping the interface screen with a portion of the interface screen is visible below the bottom of the home screen and operable to receive user input at one of the displayed second interface items.

16. The method of claim 1, further comprising:
  determining whether the mobile device is in a locked mode; and
  in response to the mobile device being in a locked mode, selecting a selected group of groups of first interface items that are displayed on the home screen, and displaying the selected group in a dimmed mode.

17. The device of claim 12, wherein the instructions, when executed, further cause the one or more processors to:
  determining whether the device is in a locked mode; and
  in response to the device being in a locked mode, selecting a selected group of groups of first interface items that are displayed on the home screen, and displaying the selected group in a dimmed mode.

18. The non-transitory machine-readable medium of claim 15, further comprising:
  instructions for determining whether the mobile device is in a locked mode; and
  instructions for, in response to the mobile device being in a locked mode, selecting a selected group of groups of first interface items that are displayed on the home screen, and displaying the selected group in a dimmed mode.

19. The method of claim 1, wherein each separated group of first interface items is displayed between two respective detent bars on the home screen and comprises a single type of interface items selected from predetermined static interface items, transitive interface items recently used by a user, predictive interface items that are predicted to be selected by the user, and assistive interface items associated with an operating system.

* * * * *